May 30, 1961 G. L. CONGDON Re. 24,994

AUTOMATIC ELECTRIC CAN OPENER

Original Filed Sept. 21, 1959 4 Sheets-Sheet 1

INVENTOR.
George L. Congdon
BY
Jones, Darby & Robertson
Attys.

AUTOMATIC ELECTRIC CAN OPENER

Original Filed Sept. 21, 1959 4 Sheets-Sheet 2

INVENTOR.
George L. Congdon
BY
Jones, Darby & Robertson
Att'ys

AUTOMATIC ELECTRIC CAN OPENER

Original Filed Sept. 21, 1959 4 Sheets-Sheet 3

INVENTOR.
George L. Congdon
BY
Jones, Barto & Robertson
Att'ys

AUTOMATIC ELECTRIC CAN OPENER

Original Filed Sept. 21, 1959 4 Sheets-Sheet 4

INVENTOR.
George L. Congdon
BY
Jones, Darby & Robertson
Attys.

United States Patent Office

Re. 24,994
Reissued May 30, 1961

24,994

AUTOMATIC ELECTRIC CAN OPENER

George L. Congdon, Fort Atkinson, Wis., assignor to Burgess Vibrocrafters, Inc., Grayslake, Ill., a corporation of Delaware Original No. 2,952,073, dated Sept. 13, 1960, Ser. No. 841,228, Sept. 21, 1959. Application for reissue Sept. 30, 1960, Ser. No. 60,284

32 Claims. (Cl. 30—4)

Matter enclosed in heavy brackets [ ] appears in the original patent but forms no part of this reissue specification; matter printed in italics indicates the additions made by reissue.

This invention relates to can openers and more particularly to electric motor driven can openers having certain features for the automatic starting and stopping of the electric motor.

The principal and general object of the invention is to provide an improved electric motor powered can opener, the improvements residing in the novel operating mechanism which is relatively simple, sturdy and "fool proof," whereby the improved can opener may be expected to provide long and trouble-free service.

A further object is to provide such a can opener which may be semi-automatic or completely automatic in operation, as desired, the machine starting and stopping in the latter instance as the result of the mere insertion and withdrawal of the can to be opened and without manual manipulation of any external lever or handle associated with the device.

Other objects and advantages of the invention will become apparent as the following description of the invention proceeds with reference to the accompany drawings in which.

As will be understood from this specification of the invention, the electric can opener, when its fullest potentialities are utilized, is capable of being started by the insertion of a can to be opened into the cutting zone without the separate manipulation of any control lever and the operating motor is automatically stopped upon completion of the severing of the lid of the can although the can is still held by the opener until it is grasped and manually removed. As a safety feature, as well as an aspect of the automatic operation, the motor driving the can opener can be started only when a can is inserted into the cutting zone in the ordinary use of the device. An operating handle is included with the can opener herein described and illustrated by way of example of the invention, but this is optional when advantage is otherwise taken of the fully automatic features of the unit.

Figure 11:
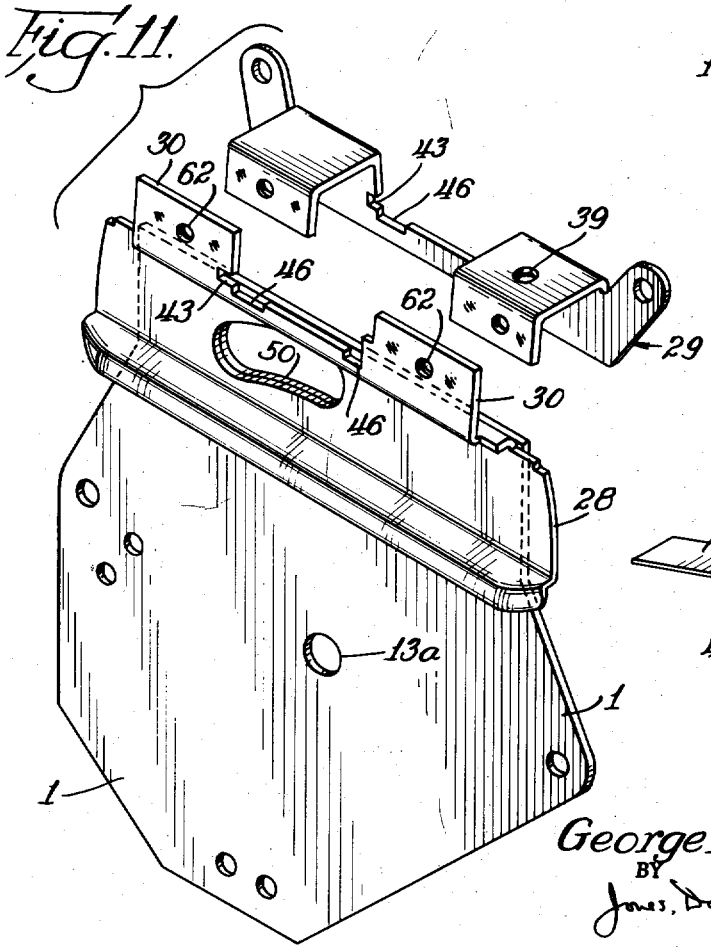
Figure 12:
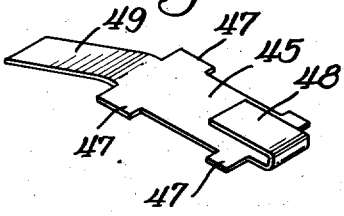

The entire operating mechanism assembly is supported upon a frame shown separately in the exploded view of Fig. 11 and including support plate 1 which, in turn, is supported within a housing 2 by means of screws 3 threaded into bosses 4 which may constitute an integral part of the housing. A re-entrant portion of the housing forms a pocket 5 for convenient lifting and carrying of the can opener. A front cover 6, having a window 7 therein for exposure of an access to the lid cutting assembly, covers and completes the housing.

A suitable electric motor, designated generally by the numeral 8 and not otherwise described in detail, is mounted upon support plate 1 by means of a suitable bracket 9. The motor shaft 10 carries a wheel 11 for the transmission of its rotary motion to the can opener mechanism, in this particular example, by belt and chain drives.

Figure 9:
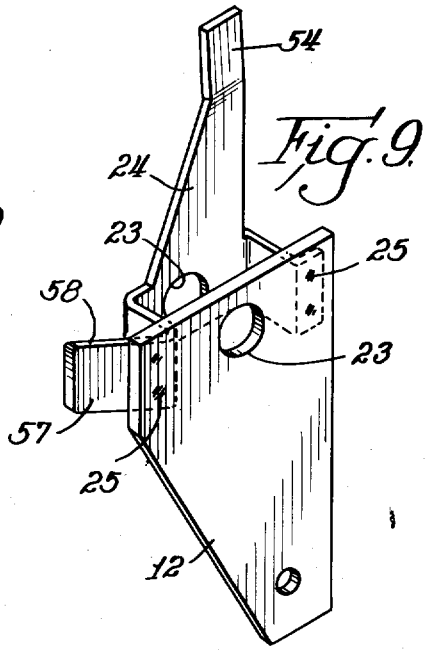

A relatively heavy bracket 12, shown separately in Fig. 9, carries the moving parts of the can opener mechanism. A stud shaft 13 extends through bracket 12 near the lower extremity thereof and is securely affixed therein. Stud 13 is journalled at 14 in support plate 1 to form a pivot mounting for the bracket upon the support plate. Pulley 15 is mounted upon stud 13 for rotation about this shaft and a sprocket wheel 16 is fast to the hub 17 of the pulley 15 to be driven thereby and, in turn, to drive wheel 18 by means of chain 19. Pulley 15 is driven by belt 20.

Shaft 21, to which wheel 18 is keyed or otherwise fastened, is journalled in a bushing 22 which bushing is mounted in openings 23 (Fig. 9) in bracket 12 and an auxiliary bracket 24 which latter may be permanently welded to the upper part of bracket 12 as indicated at 25. A collar 26 serves to properly space wheel 18 from the supporting bracket structure so that it may be turned freely by the motor and, in turn, drive shaft 21.

A can turning wheel 27, having suitable teeth on the periphery thereof for gripping the lower edge of the bead at the top of a can, is affixed to the outer end of shaft 21 for rotation thereby.

It will be understood from the foregoing that since the shaft driving the can turning wheel 27 and the associated driving mechanism are mounted in and carried by bracket 12 which, in turn, is pivoted by means of stud 13 in the fixed support plate 1, this entire can turning wheel assembly may be moved within limits by swinging the same about stud 13 whereby the position of the can turning wheel may be shifted from a retracted position at one extreme to a can opening position at the other.

A channel-like guideway 28 is permanently affixed in horizontal position along the top of support plate 1 and becomes a part of the frame assembly. A bracket 29 is welded to ears 30 upstanding from guideway 28 for the firm and fixed support of this bracket from plate 1 and to complete the opener mechanism supporting frame. This bracket provides support for the cutter blade, control switch and associated parts of the can opener mechanism. A system of locating notches is provided in the various parts of the frame to receive mating elements of the supported parts, as will be seen from the description of the cutter and switch control mechanism of the can opener.

The switch which controls the electric motor of the can opener comprises a base in the form of a relatively heavy strip 31 of insulating material carrying two terminals 32 and 33, which are respectively connected to wires connected with the motor and line conductor 34. Switch contact 35 is mounted directly in insulating base 31 while the other contact 36 is carried by the free end of a leaf spring conductor 37 which, in turn, is mounted upon the switch base and connected with terminal 32. One end of the switch base is anchored to the end of a screw 38 vhich is threaded at 39 into a portion of frame 29 and ıas a knurled head 40 for adjustment of the level of the ınchored end of the switch base to thereby adjust the posi-ion of the fixed contact 35 in relation to contact 36.

Figure 5:
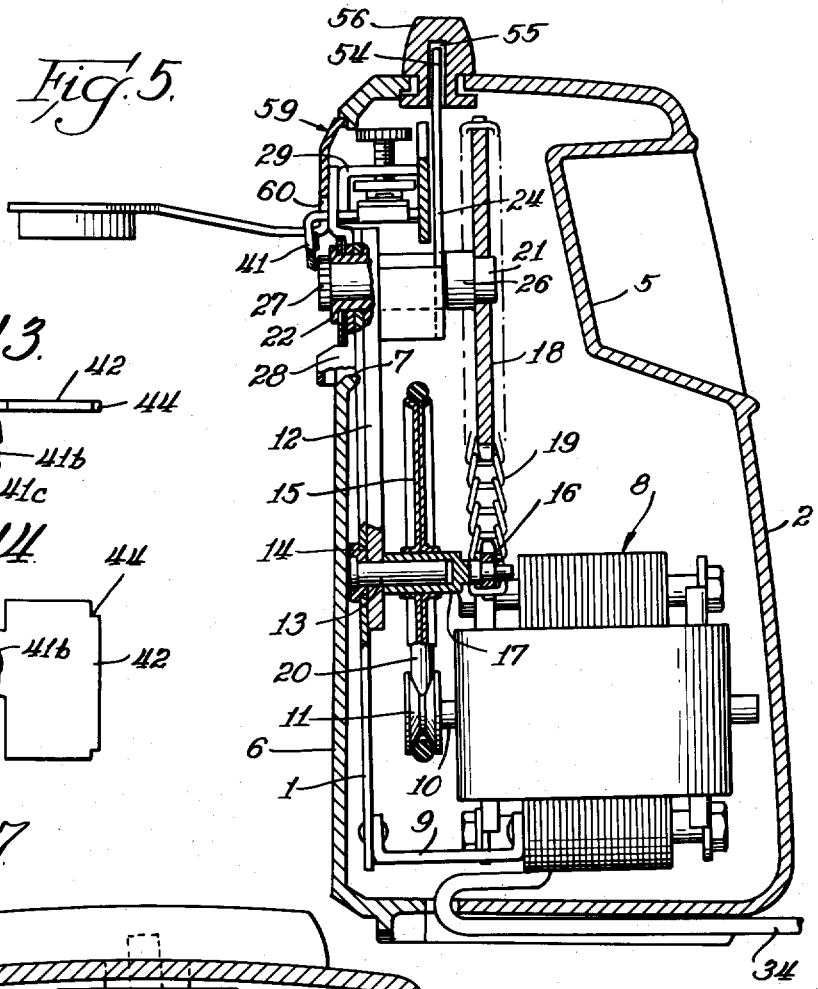
Fig. 5 is a cross-sectional view taken at the line 5—5 of Fig. 3 and showing the mechanism in can cutting position.
Figure 7:
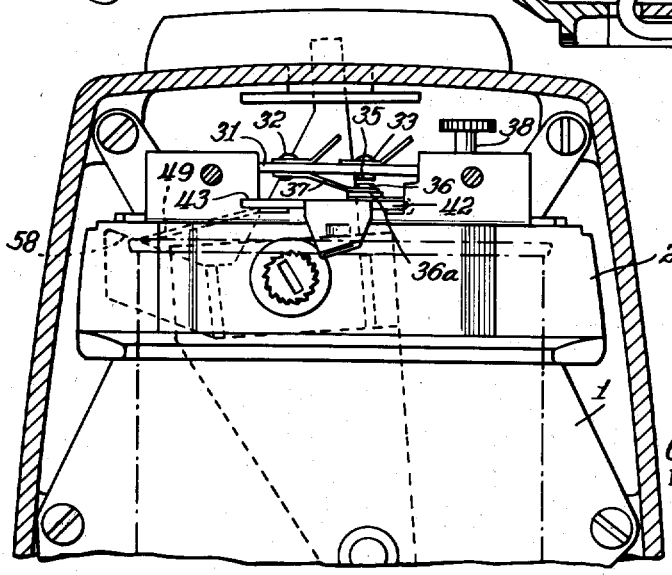
Fig. 7 is a cross-sectional view similar to that of Fig. 6 but showing the mechanism at an intermediate position at which the motor controlling switch is open but the can is retained in position upon the opener.
Figure 8:
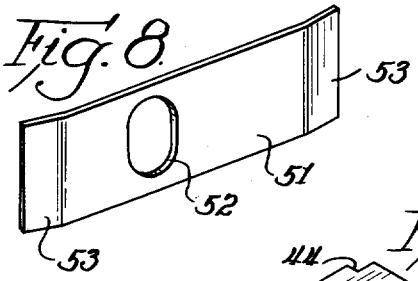
Figs. 8–12 are detail perspective views of certain parts of the can opener mechanism, Fig. 11 being an exploded view of the supporting frame.
Figure 10:
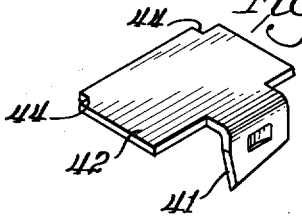

Cutter blade 41 is advantageously formed integrally vith a blade supporting plate 42. The cutter blade is urned to extend at approximately right angles, or at n angle of slightly less than ninety degrees to the sup-ıorting plate which latter rests loosely and removably ı the frame structure, especially upon bracket 29 and uideway 28. The left end of plate 42 is loosely held ı notches 43 in ear 30 (Figs. 11 and 7) and thus re-trained against vertical movement. The rear corners of late 42 are notched, as indicated at 44, to limit the ex-ent to which the cutter blade and supporting plate may e moved into the assembly upon insertion of the cutter lade into the can opener structure. It will be noted ıat the right end of plate 42 is not confined by notches omparable to notches 43, this end of the plate being ·ee to move up and down to operate the switch in a ıanner hereinafter more fully described. Upward move-ıent of the plate and blade is limited by the top of notch 0 (Fig. 5) in cover plate 59. Certain refinements in ıe form of the cutter blade are shown in Figs. 13 and 14. /hile not indispensable to the successful operation of the evice, the particular form of the blade shown in these gures has been found to assure the complete cutting of ds of cans of somewhat heavy gauge or unusually heavy de seams and it istherefore here disclosed in detail.

The blade is bent to an angle of approximately 86° ı the plane of plate 42. The cutting edge slants at an ıgle of approximately 21° to the plane of plate 42, or ıout 69° to the vertical median line of the blade. Outer evel 41a is at an angle of approximately 45° to the ad-ining surface of the cutter blade, while inner bend 41b at an angle of approximately 66° to the blade. The evels forming the edge of the blade meet at a juncture ıe 41c which is not parallel to the sides of the blade, ıt rather slants inwardly from the leading to the fol-wing end of the blade edge. This slanting of what ay be regarded as the actual cutting edge of the blade ay be established by grinding the outer and inner evels at slightly different angles to plate 42, the angle inner bevel 41b being slightly larger.

Figure 13:
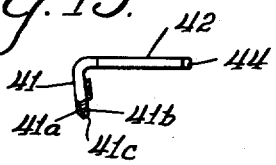
Figs. 13 and 14 are side and top views, respectively, of a preferred form of the cutter blade.
Figure 14:
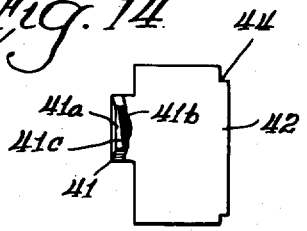

Although the exact reason for the superior operation the blade shown in Figs. 13 and 14 is not known with rtainty, it is believed that the inclination of inner bevel b and the slant of the cutting edge 41c both contribute a tendency to guide the leading edge of the blade mewhat away from the rim of the can being cut and, the same time, pressing the rim tightly to the turning ıeel, with the result that continued turning of the can ıtil completion of the cutting operation is assured.

A leaf spring 45 is also supported within the support-g frame, being located and held in position by notches and cooperating ears 47 extending laterally from the les of spring 45. The head of the spring is retroverted form a socket for the reception of plate 42 of the cut-blade, while tail end 49 is inclined for purposes here-after explained. The cutter plate 42 overlies spring and the retroverted portion 48 tends to urge the free ıht end of plate 42 downwardly upon the application an upward force to the tail end 49 of the spring. ıce the left end of plate 42 is restrained against upward ovement by notches 43, leaf spring 45 can bear or ful-ım against the under side of the plate at this location. With this arrangement, it will be understood that the itch is normally open. Without regard to the effect leaf spring 45, spring arm 37 of the switch structure esses continuously downwardly to hold plate 42 and cut-blade 41 down at its lowermost position, keeping the itch open. An upward force applied to the blade ıuld close the switch by moving the right side of plate upwardly against the pressure of spring 37. An in-ating strip or block 36a is interposed between the free end of spring conductor 37 and the underlying structure.

An arcuate slot 50 (Fig. 11) is provided in guideway 28 and plate 1, the center of curvature being at opening 13a in which stud 13 is journalled. Bushing 22 and shaft 21 pass through this slot, permitting the limited swinging movement of bracket 12 and the can turning wheel assembly about stud 13. A friction plate 51 having a vertically elongated opening 52 therein and bent-in portions 53 is arranged to slide horizontally in guideway 28, the slot 52 accommodating bushing 22 and shaft 21 of the can turning wheel. The functions of plate 51 are to provide some impedance to the swinging movements of bracket 12 and to cover slot 50.

Auxiliary bracket 24 includes a foot 54 which extends up into a socket 55 in an elongated operating button 56 which is retained between the edges of housing 2 and front cover 6 at the top of the can opener for sliding from one side to the other as bracket 12 swings between its extreme positions. A tail piece 57 having an inclined upper edge 58 is advantageously formed as a part of auxiliary bracket 24. In the can opener assembly, tail piece 57 engages the tail end 49 of leaf spring 45 at certain positions of the operating mechanism. Upward pressure applied to the tail end of the leaf spring by the tail element 57 tends to augment the spring force of spring arm 37 of the switch to urge the cutter blade downwardly. The inclined edge 58 of tail piece 57 serves as a cam surface for increasing the tension in leaf spring 45 as the bracket assembly approaches its extreme clockwise (can opening) position, so that the spring forces tending to open the switch are at their greatest magnitude when the can turning wheel and supporting bracket assembly are at the can opening position.

The can opener structure thus described is completed by a cover plate 59 which holds the cutter blade plate 42 in its proper position and covers the otherwise exposed switch mechanism. A notch 60 is provided in plate 59 to accommodate the cutter blade 41. The top of this notch also serves as a stop to limit the upward movement of the cutter blade and thus of the switch activating cuter blade plate 42. Since cover plate 59 must be removed to replace the cutter blade or adjust the switch, it is conveniently fastened to the supporting frame of the can opener by means of knurl-headed screws 61 threaded into soles 62. If desired, a bracket 63 may be provided as a part of cover plate 59 to support a permanent magnet 64 for holding the lid of a can after it is severed in the can opening operation.

Figure 1:
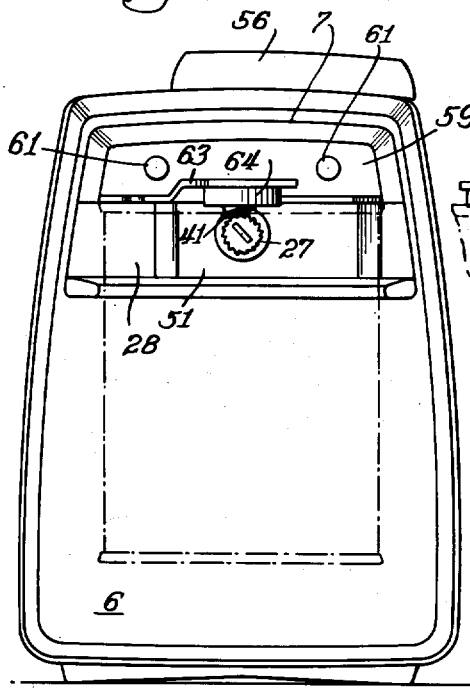
Fig. 1 is a front view of the improved electric can opener with a can indicated by dot-dash lines in the position of being opened.
Figure 2:
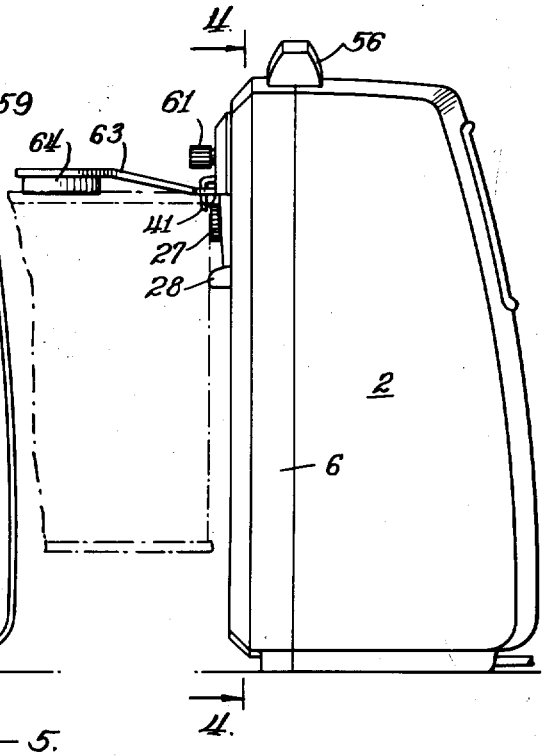
Figs. 2 and 3 are right side and top views, respectively, of the can opener shown in Fig. 1.
Figure 3:
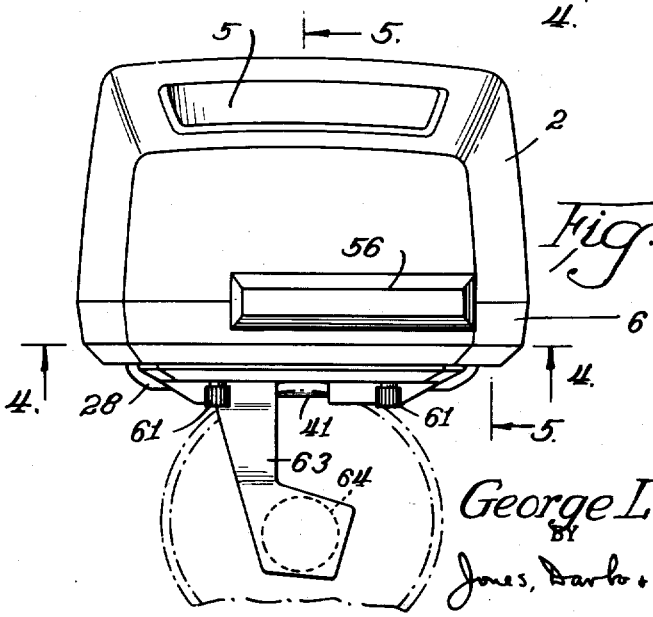
Figure 4:
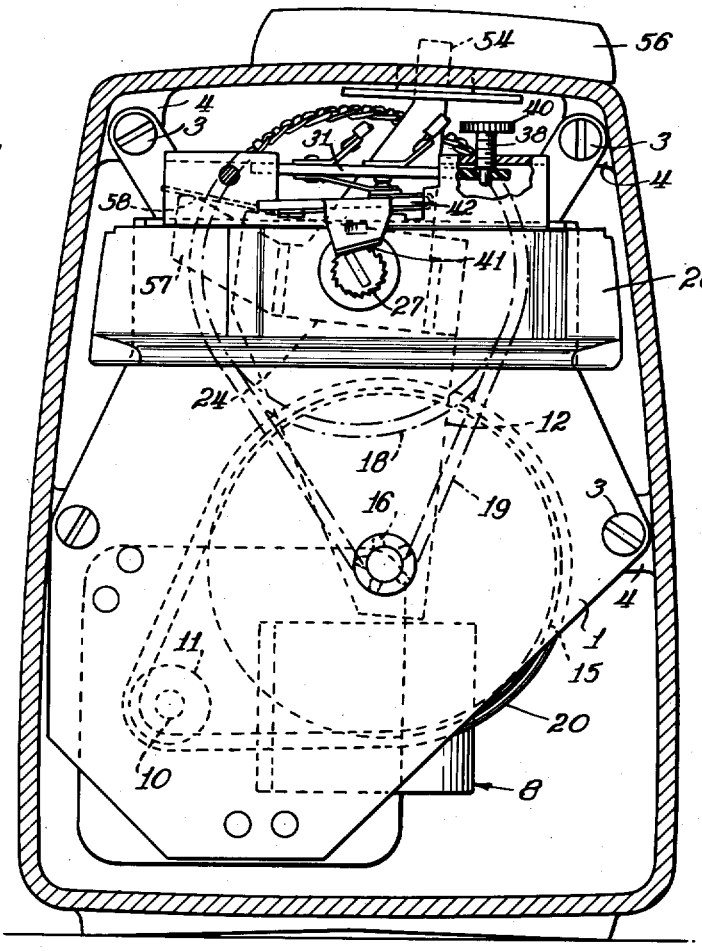
Fig. 4 is a cross-sectional view taken at the line 4—4 of Figs. 2 and 3 and showing the mechanism in can cutting position.
Figure 6:
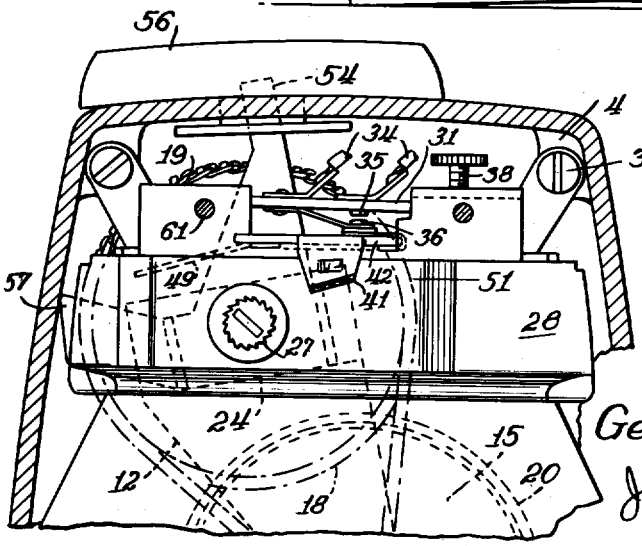
Fig. 6 is a cross-sectional view corresponding to that of Fig. 4 but showing the mechanism in retracted position.

The can opener herein shown and described by way of example of the invention contemplates rotation of the can driving wheel 27 in a counterclockwise direction. The slanting edge of cutter blade 41 is, accordingly, inclined from left to right so that the turning of a can being opened by the can turning wheel forces the metal being cut against the inclined edge. The mechanism is arranged to permit the swinging movement of bracket 12 carrying the can turning wheel assembly between a retracted position at which the turning wheel is below and to the left of the cutter blade, as shown in Fig. 6, and a can opening position at which the can turning wheel is in vertical alignment with, and in back of, the cutter blade as shown in Fig. 4. These two positions represent the extremes of permissible swinging movement of bracket 12 and the can turning wheel assembly. At an intermediate position, shown in Fig. 7, the can turning wheel is shifted a short distance to the left and, since the bracket carrying the wheel is pivoted at the shaft 13, somewhat lower than the position of the can turning wheel in can cutting position. Pivot 13 is located slightly to the right of a vertical line depending from the cutter blade.

The normal position of the can opener mechanism when not in use is the retracted position as illustrated in Fig. 6. At this position, the switch is open and the motor inactive. To open a can, the can is placed in position with the top bead or rim in place upon the teeth of the can turning wheel, the rim of the can being brought under and in back of the edge of the cutter blade. Then, to start the motor and initiate the cutting operation, control button 56 may be manually shifted to the right, forcing the can upwardly as bracket 12 is thus rotated in a clockwise direction, the upward movement of the can forcing the cutter blade and, with it, plate 42 upwardly to close the switch. Alternatively, the can, after insertion into initial position, is tilted somewhat to serve as a lever bearing down upon the can turning wheel and up against the cutter blade to close the switch and start the motor in operation. In either case, the initial rotation of the can turning wheel, gripping the rim or bead of the can, brings about movement of the bracket 12 to the final can cutting position of the can turning wheel immediately under and in back of the cutter blade for completion of the severing of the lid of the can.

The initial piercing of the lid is thus brought about by the turning of the wheel by the motor. The switch is maintained in closed position after the piercing of the lid and during the entire cutting process due to the inclination of the cutting edge whereby the resistance of the metal to cutting continuously presses the cutter blade upwardly to keep the switch closed. When the lid has been completely severed, this upward force is discontinued and the cutter blade, together with the right side of cutter blade plate 42, shifts downwardly responsive to the combined forces of springs 37 and 45. This movement opens the switch and stops the motor. The can is still held between the wheel and the blade in the can opener with the motor inoperative. The opened can may then be removed by grasping it and moving it slightly to the left to shift the can turning wheel away from the blade toward the retracted position and permitting the ready withdrawal of the opened can from the apparatus. This operation is assisted somewhat by the pressure of the tail portion 49 of spring 45 against the inclined edge 58 of the tail 57 of auxiliary bracket 24. The severed lid of the can is retained by magnet 64. The operating button 56 may, of course, be used if desired, in facilitating removal of the opened can from the can opener.

It will be noted that the form and dimensions of the tail portion 49 of spring 45 and the cooperating tail 57 of auxiliary bracket 24 are such that movement of the can turning wheel assembly between the retracted and intermediate positions does not bring the spring 45 into play, while distortion of the spring member is progressively increased as the can turning wheel assembly is moved from the intermediate position to the can opening position. Thus, a comparatively small force exerted upwardly by the lid of the can against the cutter blade is sufficient to close the switch. Conversely, the spring force exerted by spring 45 tending to open the switch upon completion of the lid cutting operation is greatest in the can opening position whereby upon completion of the cut the desired opening of the switch and stoppage of the motor is assured. This spring pressure gradually diminishes as the intermediate position is approached. The friction strip 51 provides sufficient drag to hold the can turning wheel assembly at the desired positions, especially the can cutting position following cutting of the lid, to prevent accidental dropping of the opened can.

The position of fixed switch contact 35 may readily be adjusted by turning screw 38 to insure proper automatic operation of the can opener. This screw is readily accessible upon removal of cover plate 59. Removal of this cover plate also permits replacement of the cutter blade as required.

The particular form of electric can opener herein shown and described is merely one example of the invention. The arrangement and specific forms of the several parts may be altered, but such devices which employ the inventive concept herein disclosed are intended to be included within the scope of the appended claims as the equivalent of the example specifically described.

Invention is claimed as follows:

1. A can opener comprising a supporting frame, ar electric motor and a switch therefor mounted upon saic frame, a cutter blade having an inclined edge supportec near the top of said frame with a degree of freedom foı vertical movement, a bracket pivotally mounted in saic frame below said blade, a can turning wheel journalled ir said bracket, transmission means operatively intercon- nected between said motor and said can turning wheel foı turning said wheel, and means responsive to the positioı of said cutter blade for closing said switch when said blade is elevated and opening said switch when said blade i: lowered, the arrangement of said bracket being such tha movement thereof moves said can turning wheel betweeı can cutting position below and behind said blade and re tracted position away from said blade whereat a can caı be inserted and removed from cutting position on said caı opener.

2. A can opener in accordance with claim 1 and in cluding spring means pressing the cutter blade down wardly.

3. A can opener in accordance with claim 2 wherei the magnitude of the spring pressure pressing down wardly upon the cutter blade is such that it may be over come to close the switch by pressure exerted upwardly a the edge of said blade by the lid of a can and the degre of inclination of said edge of said blade is such that th resistance to cutting of the metal of the lid of a can bein opened exerts a vertical component of force to said blad sufficient to overcome said spring pressure and maintai said switch closed while the lid is being cut in the norma operation of said can opener.

4. A can opener in accordance with claim 2 wherei the magnitude of the spring pressure is sufficient to mov the cutter blade downwardly and open the switch whe the lid of a can being opened has been completely cu from the can.

5. A can opener in accordance with claim 2 wherei the spring means includes a leaf spring whereof one en is connected with the cutter blade and the other end i free, said bracket including a tail piece rigidly extendin therefrom and having an inclined cam surface arranged t engage said free end of said leaf spring, the arrangemer being such that movement of said bracket toward ca cutting position loads said leaf spring to increase th downward pressure applied thereby to the cutter blad 6. A can opener in accordance with claim 2 wherei the spring means includes a leaf spring whereof one en is connected with the cutter blade and the other end free, said bracket including a tail piece rigidly extendin therefrom and having an inclined cam surface arrange to engage said free end of said leaf spring, the arrang ment being such that movement of said bracket towar can cutting position loads said leaf spring to progressivel increase the magnitude of the pressure applied to th cutter blade to a maximum value at the can cutting pos tion.

7. A can opener in accordance with claim 2 wherei the spring means includes a leaf spring whereof one en is connected with the cutter blade and the other end free, said bracket including a tail piece rigidly extendir therefrom and having an inclined cam surface arrange to engage said free end of said leaf spring, the arrang ment being such that said tail piece engages said free en of said leaf spring only at positions of said bracket b tween an intermediate position and the can cutting pos tion thereof and movement of said bracket toward ca cutting position from said intermediate position loa said leaf spring to increase the downward pressure a plied thereby to the cutter blade.

8. A can opener in accordance with claim 1 and i cluding a housing wherein the supporting frame mounted and an operating member fast to said brack and extending through said housing for manually movir said bracket between can cutting and retracted position 9. A can opener in accordance with claim 1 where ıe characteristics of the motor and transmission means re such that in normal operation of said can opener the an turning wheel is rotated to cause the upper peripheral ortion of said wheel to move in a predetermined side-'ise direction, the retracted position of said wheel is in ıid predetermined direction from the cutter blade, the ıge of said blade is inclined *upwardly* in a direction op-osite to said predetermined direction, and the bracket pivoted at a location slightly spaced in the direction pposite to said predetermined direction from a vertical ne depending from said cutter blade.

10. A can opener in accordance with claim 1 and in-luding friction means for impeding movement of the ın turning wheel between retracted and can cutting ɔsitions whereby said wheel maintains a given position ntil moved with positive force.

11. A can opener in acordance with claim 1 wherein ıe transmission means comprises two stages and includes ı intermediate shaft, a driven wheel of the first stage ıd a driving wheel of the second stage carried upon ıid shaft and fixed against rotation relative to each other, ıid shaft forming the pivot of the bracket whereby said ansmission is operative to turn the can turning wheel any position thereof between retracted and can cutting ɔsitions.

12. A can opener in accordance with claim 1 wherein ıe transmisison means comprises two stages and includes ı intermediate shaft, a driven wheel of the first stage ıd a driving wheel of the second stage carried upon said ıaft and fixed against rotation relative to each other, id shaft being fixedly mounted in the bracket and jour-ılled in the supporting frame to form the pivot of said 'acket whereby said transmission is operative to turn e can turning wheel at any position thereof between re-acted and can cutting positions.

13. A can opener in accordance with claim 1 wherein e cutter blade extends downwardly and inwardly toward e supporting frame at an angle of approximately 86° horizontal and the edge thereof is inclined at an angle approximately 21° to horizontal, said edge being rmed by outer and inner bevels of approximately 45° 66°, respectively.

14. In an electric can opener having supporting struc-re, a cutter blade having a downwardly directed in-ned edge, said blade being vertically resiliently sup-ırted in said structure, a normally open switch sup-ırted in said structure above said blade, means opera-'ely connecting said blade with said switch to cause ɔsure of said switch when said blade is moved upwardly d opening of said switch when said blade is moved wnwardly, and means for bringing the lid of a can be opened to bear upwardly against said edge of said ıde to move said blade upwardly to close said switch, d last-mentioned means comprising a can turning wheel ɔvably supported in said structure and adapted to en-ge the under surface of the bead at the top of a can.

15. The device of claim 14 wherein the can turning ıeel is so mounted in the structure that movement there-is confined to positions on a generally inclined path tween a retracted position at one side of and lower ın the cutter blade and a can cutting position behind d below said blade but higher than the retracted ɔition.

16. The device of claim 14 and including means for ıusting the position of the switch.

17. The device of claim 14 wherein the can turning eel is so mounted in the structure that movement there-is confined to positions on a generally inclined path ween a retracted position at one side of and lower n the cutter blade and a can cutting position behind l below said blade but higher than the retracted posi-ı, and including a spring biasing the switch toward ɜn position, and spring means pressing the cutter blade vnwardly and means for progressively increasing the gnitude of the pressure exerted by said spring means as the can turning wheel approaches can cutting position.

18. A can opener comprising a housing, a supporting frame including a vertical support plate mounted in said housing, an electric motor mounted upon said plate, a normally open switch electrically connected with said motor and mounted in the upper part of said frame, a channel-like guideway horizontally mounted upon the upper portion of said vertical support plate, a vertically movable cutter blade support plate horizontally arranged under said switch to control the same, a cutter blade attached to said blade support plate and extending downwardly outside of said guideway and said housing, a leaf spring adapted to press said blade support plate downwardly, a bracket pivotally mounted on said vertical support plate below said cutter blade and slightly to the right of a vertical line depending therefrom, a can turning wheel shaft journalled in the upper part of said bracket and a can turning wheel fast thereto and exposed outside of said guideway and said housing for cooperation with said cutter blade, a brake strip arranged for frictional movement in said guideway and having an opening therein through which said can turning wheel passes, an intermediate shaft fixedly mounted in said bracket and journalled in said vertical support plate to form the pivot for said bracket, a driven wheel upon said intermediate shaft connected for rotation by said motor, a sprocket upon said intermediate shaft in fixed relation to said driven wheel, a toothed wheel fixed upon said can turning wheel shaft, and a chain entrained around said sprocket and said toothed wheel, said bracket being free to swing about said intermediate shaft between retracted and can cutting positions, the arrangement being such that movement of said bracket and can turning wheel carried thereby with a can in position thereon to be opened toward said can cutting position causes the lid of the can to force said blade and said blade supporting plate upwardly to close said switch and cause the motor to start and turn the can turning wheel whereupon to first pierce the lid of the can and then cut the lid thereupon whereafter the spring pressing downwardly upon said cutter blade support plate causes said plate to move downwardly and permit said switch to open and stop said motor.

19. A can opener in accordance with claim 18 and including a foot extending from the bracket to the exterior of the housing for manual manipulation of said bracket.

20. A can opener in accordance with claim 18 and including means for adjusting the position of the switch with respect to the cutter blade support plate.

21. For use with a can opener, a vertical cutter blade having an inclined edge formed by outer and inner bevels meeting at a juncture line, said edge being disposed at an angle of approximately 69° to the vertical blade, the angles of said outer and inner bevels with the adjoining surfaces of the blade being approximately 45° and approximately 66°, respectively.

22. A cutter blade in accordance with claim 21 wherein the juncture line of the outer and inner bevels extends from the leading to the following end of the edge of said blade in a direction starting inwardly toward the side of said blade which engages the rim of a can during the cutting operation.

23. For use with a can opener, a cutter blade and supporting assembly comprising a cutter blade in accordance with claim 21 and a supporting plate integral with said blade and defining an angle of approximately 86° with the side of said blade adjoining the inner bevel of the edge thereof.

*24. A can opener comprising: a supporting frame; an electric motor and a switch therefor mounted upon said frame; a cutter blade having an inclined edge supported near the top of said frame; a bracket pivotally mounted in said frame below said blade; a can turning wheel rotatably mounted on said bracket; transmission means operatively interconnected between said motor and said can turning wheel to turn said wheel; means including a*

*manually operable handle for pivoting said bracket to bring the lid of a can engaged by said wheel into engagement with said blade while maintaining operative interconnection of said wheel with said motor; and means interconnected with said means for pivoting said bracket for closing said switch to actuate said motor and turn said wheel to cause said blade to pierce and cut the lid of the can.*

*25. A can opener comprising: a supporting frame; an electric motor and a switch therefor mounted upon said frame; a cutter blade having an inclined edge supported on said frame; a bracket pivotally mounted in said frame below said blade; a can turning wheel journalled in said bracket; transmission means operatively interconnected between said motor and said can turning wheel to turn said wheel; and means for sequentially first bringing said can turning wheel to substantially can lid piercing position and thereafter closing said switch to energize said motor.*

*26. A can opener comprising: a supporting frame; an electric motor and a switch therefor mounted upon said frame; a cutter blade having an inclined edge supported near the top of said frame; a bracket pivotally mounted in said frame below said blade; a can turning wheel rotatably mounted on said bracket; transmission means operatively interconnected between said motor and said can turning wheel to turn said wheel; means including a manually operable handle for pivoting said bracket to bring the lid of a can engaged by said wheel into engagement with said blade while maintaining operative interconnection of said wheel with said motor; and means interconnected with said means for pivoting said bracket for closing said switch to activate said motor and turn said wheel to cause said blade to pierce and cut the lid of the can; said last-mentioned means being responsive to the completion of the lid cutting operation for opening said switch to stop the motor.*

*27. A can opener comprising: a supporting frame; an electric motor and a switch therefor mounted upon said frame; a cutter blade having an inclined edge supported near the top of said frame; a bracket pivotally mounted in said frame below said blade; a can turning wheel journalled in said bracket; transmission means operatively interconnected between said motor and said can turning wheel to turn said wheel; first means for bringing said can turning wheel to can lid piercing position and for closing said switch to energize said motor to cause the piercing and cutting of said lid; and second means biased by manipulation of said first means for opening said switch upon completion of the lid cutting operation.*

*28. A can opener comprising: a supporting frame; an electric motor and switch therefor mounted upon said frame; a cutter blade having an inclined edge supported near the top of said frame; a bracket pivotally mounted in said frame below said blade; a can turning wheel journalled in said bracket; transmission means operatively interconnected between said motor and said can turning wheel to turn said wheel; and means including a manually*

*operable handle for pivoting said bracket carrying sa can turning wheel to substantially can lid piercing po tion relative to said blade and for closing said switch energize said motor to cause the piercing and cutting the lid of a can held between said wheel and said bla*

*29. A can opener comprising: a supporting frame; electric motor and switch therefor mounted upon su frame; a cutter blade having an inclined edge support near the top of said frame; a bracket pivotally mounted said frame below said blade; a can turning wheel jou nalled in said bracket; transmission means operatively terconnected between said motor and said can turni wheel to turn said wheel; and manual means for pivoti said bracket carrying said can turning wheel to substanti ly can lid piercing position and for retracting said brac and said can turning wheel to a retracted position relati to said blade while maintaining operative interconnecti of said wheel with said motor.*

*30. In a can opener: a supporting frame; an elect motor mounted upon said frame; a cutter blade havi an inclined edge supported near the top of said frame bracket pivotally mounted in said frame below said bla a can turning wheel rotatably mounted on said bracket that pivoting said bracket moves said wheel to positi on a generally inclined path between a retracted positi at one side of and lower than said cutter blade and a c cutting position behind and below said blade but hig than the retracted position; and transmission means ope tively interconnected between said motor and said c turning wheel to turn said wheel for can cutting operati*

*31. Structure in accordance with claim 30 wherein transmission means comprises two stages and includes intermediate shaft, a driven wheel of the first stage an driving wheel of the second stage being carried upon s shaft and fixed against rotation relative to each other, pivot of the bracket and said intermediate shaft being axial whereby said transmission is operative to drive can turning wheel at any position thereof between tracted and can cutting positions.*

*32. In a can opener: a supporting frame; an electric m tor mounted upon said frame; a cutter blade having an clined edge supported near the top of said frame; a bra et pivotally mounted in said frame below said blade can turning wheel rotatably mounted on said brac transmission means including a driving wheel having axis co-axial with the axis of pivot of said bracket an driven wheel operatively engaging said driving wheel be driven thereby, said driven wheel and said can turn wheel being mounted upon a common shaft for rotat therewith whereby to drive said can turning wheel at position thereof between retracted and can cutting p tions.*

References Cited in the file of this patent or the original patent

UNITED STATES PATENTS

| | | |
|---|---|---|
| 1,833,743 | Girard | Nov. 24, 19 |
| 1,989,807 | Jeppsson | Feb. 5, 19 |